United States Patent
Straehle et al.

(10) Patent No.: US 7,471,458 B2
(45) Date of Patent: Dec. 30, 2008

(54) OBJECTIVE FOR AN OBSERVATION DEVICE, A MICROSCOPE, AND A METHOD FOR ADJUSTING AN OBJECTIVE

(75) Inventors: Fritz Straehle, Heubach (DE); Christoph Hauger, Aalen (DE)

(73) Assignee: Carl Zeiss AG, Oberkochen (DE)

( * ) Notice: Subject to any disclaimer, the term of this patent is extended or adjusted under 35 U.S.C. 154(b) by 0 days.

(21) Appl. No.: 11/010,120

(22) Filed: Dec. 10, 2004

(65) Prior Publication Data
US 2005/0174655 A1    Aug. 11, 2005

(30) Foreign Application Priority Data
Dec. 10, 2003    (DE) ............... 103 57 739
Oct. 27, 2004    (DE) ............... 10 2004 052 253

(51) Int. Cl.
G02B 21/02    (2006.01)
G02B 15/14    (2006.01)

(52) U.S. Cl. .................. 359/656; 359/368; 359/676
(58) Field of Classification Search .......... 359/656–661
See application file for complete search history.

(56) References Cited

U.S. PATENT DOCUMENTS

| | | | |
|---|---|---|---|
| 4,155,622 A | 5/1979 | Klein | |
| 5,270,866 A | 12/1993 | Oizumi et al. | |
| 5,701,196 A | 12/1997 | Nakamura | |
| 5,731,910 A | 3/1998 | Baumann | |
| 5,731,911 A | 3/1998 | Kagoshima | |
| 5,995,295 A * | 11/1999 | Nagaoka | 359/654 |
| 6,110,106 A * | 8/2000 | MacKinnon et al. | 600/181 |
| 6,134,052 A | 10/2000 | Yano | |
| 6,142,934 A * | 11/2000 | Lagerway et al. | 600/200 |
| 6,335,833 B1 * | 1/2002 | Kawasaki | 359/686 |
| 6,582,362 B2 * | 6/2003 | Konno | 600/167 |
| 6,674,582 B2 * | 1/2004 | Kawasaki | 359/690 |
| 2004/0090667 A1 * | 5/2004 | Gartner et al. | 359/368 |
| 2005/0219685 A1 * | 10/2005 | Swift et al. | 359/368 |
| 2006/0274444 A1 * | 12/2006 | Haisch | 359/900 |

FOREIGN PATENT DOCUMENTS

DE    G9016892.5 U1    4/1991

* cited by examiner

*Primary Examiner*—Jordan M. Schwartz
(74) *Attorney, Agent, or Firm*—Kriegsman & Kriegsman (57) ABSTRACT

The invention concerns an objective (1) for an observation device (10), whereby the objective comprises an objective-lens-system, which consists of a first optical subcomponent (11, 14) on the object side and a second, optical subcomponent (12, 15), whereby the second optical subcomponent (12, 15) is arranged at a distance (d2) to the first optical subcomponent (11, 14) on the optical axis of the objective, and one of the subcomponents (12, 14) possesses a positive refractive power and the other subcomponent (11, 15) possesses a negative refractive power, which is hereby characterized in that the objective (1) has a zooming device. In addition, the invention concerns a microscope, which contains such an objective. Finally, a method for adjusting an objective (1) of an observation device (10) is provided with the invention.

16 Claims, 7 Drawing Sheets

H = principal plane

FIG. 4

AA = working distance

FIG. 5

AA = working distance
H = principal plane

H = principal plane

OBJECTIVE FOR AN OBSERVATION DEVICE, A MICROSCOPE, AND A METHOD FOR ADJUSTING AN OBJECTIVE

BACKGROUND OF THE INVENTION

The present invention concerns an objective for an observation device, in particular for a microscope, as well as a microscope and a method for adjusting an objective.

Microscopes, in particular, stereomicroscopes, are used, for example, in order to be able to provide the surgeon with the image of the site to be treated as an enlarged image during operations. Operating microscopes are usually constructed according to the telescopic principle and essentially comprise three optical components, namely a principal objective, an afocal zooming system and a binocular telescopic tube. At the interfaces of these optical components, the beam bundles run parallel, i.e, the image is situated in infinity. Under these assumptions, these optical components can be exchanged in a very simple way for other components, as in a modular system. Thus, for example, one principal objective can replaced by another principal objective.

Such an exchange, in which, for example, an objective of one focal length is replaced by an objective of another focal length, can be utilized advantageously, in particular, in operating microscopes. The focal length of the principal objective in fact influences a number of parameters and primary optical quantities of the objective or the microscope, respectively, including among others the working distance. The working distance represents the shortest distance between the object plane and the objective of a microscope. The working distance thus determines the free working space between object field and operating microscope, which is available to the surgeon, as well as the distance between the surgeon's eyepiece view and the object field.

In order to be able to make available the necessary working distance for the surgeon for different situations, exchangeable objectives have therefore been developed for varying the working distance, by means of which the principal objective of one focal length can be replaced by a principal objective of another focal length. Depending on the respective professional discipline, exchangeable objectives with focal lengths of, for example, between approximately f=150 mm and 500 mm are used as exchangeable objectives.

An exchangeable objective is in general a simple cemented member and thus the working distance is approximately equal to the focal intercept of the objective, thus equal to the distance from the vertex of the lens on the object side to the focal point in the object plane and approximately equal in magnitude to the focal length of the objective.

In addition to the working distance, thus the focal intercept of the objective, there are also other primary optical quantities of the operating microscope, however, that are of importance to the surgeon. These include, for example, the total magnification, the stereo angle, the diameter of the object field, the resolution of the object, the depth of sharpness and the like. These primary optical quantities, of course, also depend on the focal length of the objective used. If an objective of another focal length is used for variation of the working distance, then these optical quantities are also influenced due to the change in focal length.

For example, the total magnification is inversely proportional to the focal length of the objective. Also, the stereo angle determining the stereo impression is inversely proportional to the focal length of the objective.

In order to be able to avoid changing the objective, as must be performed in the case of an exchangeable objective, objectives have been developed in which variable working distances can be provided with a single objective. This represents a great practical advantage in several fields of application of microsurgery, whereby still even today, after more than a decade from the first application, this type of objective continually finds new fields of application. These objectives usually have a two-part construction and comprise an optical member with negative refractive power and an optical member with positive refractive power. Depending on the arrangement of these two members, the objectives are designated as objectives according to the telescopic system or objectives according to the retrofocus system.

Objectives with variable working distance are also designated as varioscopes in the following. A varioscope is described, for example, in DE 2,439,820 A1. This objective is comprised of a movable positive member and a stationary negative member, which are separated from one another by a distance. The optical construction is in principle that of a telescopic system, i.e., the negative lens is introduced on the object side. The positive member is comprised of a cemented member and a single lens, has a focal length of 110 to 130 mm and can be moved about 16 to 20 mm for variation of the working distance. The stationary negative member is comprised of a cemented member and can be exchanged in order to expand the working distance. With a focal length of 120 mm for the positive member and a displacement path of 16 mm also for the positive member, the working distance can be shifted from 160 mm to 220 mm, with a negative member with the focal length of −160 mm. Under otherwise equal conditions, the working distance can be shifted from 197 mm to 300 mm with a negative member with the focal length of −200 mm.

An objective of the varioscope type according to the telescopic system is also described in the German Utility Model G 90 16 892.5. Here a negative lens member with a focal length between −105 mm and −135 mm is arranged on the front side, i.e., turned toward the object plane, and a positive lens member comprised of a cemented member and a single lens with a focal length between 100 mm and 120 mm is arranged so that it can be moved thereunder. The displacement path of the positive member lies between 21 mm and 30 mm. Without an exchange of optical members, this varioscope has a working distance range of 150 mm to 450 mm.

In comparison to principal objectives with a fixed focal length, which are generally comprised only of a single cemented member, in the case of varioscopes, the primary optical quantities are considerably varied. These differences are a logical consequence of the discrepancy between the focal length and the focal intercept, i.e., approximately the working distance which is present in a varioscope.

While in the case of an exchangeable objective with a fixed focal length, the focal length is approximately equal to the focal intercept and thus equal to the working distance, in the case of telescopic systems of a varioscope, the focal length is clearly greater than the working distance. Therefore, the total magnification, the stereo angle, the resolution of the object, the depth of sharpness and also the diameter of the object field are also changed when compared to a principal objective with a fixed focal length.

With a longer focal length, in particular, a smaller total magnification and a smaller stereo impression are obtained. For this reason, which is described in U.S. Pat. No. 5,701,196, the problem which is the basis of the invention is to create a focal length, which is shorter than the working distance, with an objective lens system. Additionally, it should be possible to change the working distance. This problem is solved according to the publication by employing either an objective lens system which possesses a modified telescopic system construction, or an objective lens system which has the construction of a so-called retrofocus system, i.e., an inverted telescopic system. In the modified telescopic system described in U.S. Pat. No. 5,701,196, a very concavely curved surface, by means of which the principal plane of the objective is displaced, and thus the focal length of the objective can be shortened, is introduced on the first surface of the positive member. In the case of the retrofocus system, the effect is obtained by introducing the positive member on the object side.

Also in the case of the retrofocus system, there exists, of course, a discrepancy between the focal length and the focal intercept, thus also the working distance, whereby in the case of the retrofocus system, the focal length is clearly shorter than the working distance; the principal plane thus lies between the object plane and the objective.

Such varioscopes according to the retrofocus system introduce several advantages. In particular, as described in U.S. Pat. No. 5,701,196, an increase in the total magnification and the stereo impression are obtained with such varioscopes. Of course, these systems have the disadvantage that they possess a smaller object field diameter and a smaller depth of sharpness than telescopic systems. In several cases this can be undesired by the user of a microscope with such an objective, for example, by a surgeon, or it may be perceived as troublesome.

SUMMARY OF THE INVENTION

The object of the present invention is thus to create a solution, with which it will be possible for the surgeon to adjust a microscope according to various requirements on the fly. This solution will be achieved in an optically simple way and the microscope will have a simple construction.

According to a first aspect of the invention, this object is thus solved by an objective for an observation device, which comprises a first optical subcomponent on the object side as well as a second optical subcomponent, whereby the second optical subcomponent is arranged at a distance to the first optical subcomponent on the optical axis of the objective and one of the subcomponents possesses a positive refractive power and the other subcomponent possesses a negative refractive power, whereby the objective is hereby characterized in that it has a zooming device and is designed so that an image is produced with it from the finite to the infinite.

The advantage of this configuration of an objective lies in the fact that the rays coming from an object found in front of the objective, when they exit the objective, leave as parallel rays and thus can be further processed in a simple way corresponding to the requirements of the user. Due to this design, which can be influenced, in particular, by adjusting the optical system data, it is possible to exchange an objective of a conventional microscope for the objective according to the invention, without making necessary further modifications in the other components of the microscope. In addition, other components that are in the way of the objective according to the invention can be simply replaced. In addition, by imaging the objective from finite to infinite, i.e., by generating parallel beam bundles from one object, it is possible to use this for stereoscopic purposes. In particular, the objective according to the invention can be utilized in a stereoscopic operating microscope.

The subcomponent with positive refractive power is also designated as the positive subcomponent in the following and the subcomponent with negative refractive power is designated as the negative subcomponent.

With the objective according to the invention, due to the construction comprised of a positive subcomponent and a negative subcomponent, there is the possibility of focusing, i.e., adjusting the focal intercept of the objective. In addition, the possibility is created in the objective according to the invention of adjusting the focal length of the objective by the zooming device. By varying these two parameters, the objective can be utilized more flexibly than conventional objectives and can be better adapted to the requirements of the user. Also, due to the integration of the zoom function in the objective, both structural advantages as well as improvements in design can be created when compared with the conventional combination comprised of an objective and a separate zooming device in a microscope.

According to another aspect, the object is solved by an objective for an observation device, which comprises a first optical subcomponent on the object side and a second optical subcomponent, whereby the second optical subcomponent is arranged at a distance to the first optical subcomponent on the optical axis of the objective, and one of the subcomponents possesses a positive refractive power while the other subcomponent possesses a negative refractive power, wherein the working distance of the objective is variable. Here, the objective is characterized in that the focal length can be varied independently from the working distance.

For purposes of the present specification and claims, unless specifically noted otherwise, the term "focal length" is defined to mean the distance from the object plane to the principal plane H of the objective lens.

Due to the fact that the focal length can be varied independently from the working distance, the objective according to the invention can be utilized in a particularly versatile manner. A user of a microscope, in which such an objective is utilized, for example, an operating surgeon, after adjusting the working distance to a position that he desires, can adjust the focal length so that the optical quantities, which are known to him from the exchangeable objective, can be achieved. The freedom of movement for operating equipment that may be used is not adversely affected hereby. According to the invention, this freedom can be brought about in particular by an objective, in which optical subcomponents provided therein are disposed and fastened in such a way that each of these subcomponents can be axially displaced. A fixing of one of the subcomponents is also not desired, even when one or two subcomponents are not moved from their position, which is optional each time, for the focusing and zooming.

The objective can be configured so that different ratios of focal length to working distance can be adjusted with it. According to one embodiment, the objective is configured so that its focal length can be adjusted independently of the working distance, i.e., with unchanged working distance, so that ratios of focal length to working distance can be adjusted in a range of 0.4 to 1.5, preferably in the range of 0.6 to 1.3 and, particularly preferred, in the range of 0.5 to 1. In this embodiment, the subcomponent on the object side possesses a positive refractive power. With ratios which lie in this range, the standards, which the user both estimates and utilizes in the case of retrofocus objectives, are sufficiently achieved. Thus, increases of the total magnification and of the stereo impression which are known from objectives according to the construction of the retrofocus system can be achieved. With the same objective, however, the primary optical quantities of an exchangeable objective with a fixed focal length can also be achieved, since the range of the adjustable ratios also includes a ratio of 1.

According to another embodiment, the objective is designed so that, with an unchanged working distance, ratios of the focal length to the working distance can be adjusted in a range of 0.5 to 2.0, preferably in the range of 0.8 to 1.5 and, particularly preferred, in the range of 1 to 1.5. In this embodiment, the subcomponent on the object side possesses a negative refractive power. With this embodiment, the diameter of the object field and the depth of sharpness, which can be achieved with telescopic systems, can also be achieved with the objective according to the invention. Since a ratio of 1 can also be adjusted between focal length and working distance in this embodiment, the primary optical quantities of an exchangeable objective with a fixed focal length can also be achieved with this objective.

The objective is preferably designed so that the difference between the focal length and the focal intercept of the objective can be adjusted to values of less than 50 mm, preferably of less than 20 mm, more preferably of less than 10 mm and most preferably equal to 0 mm. For this purpose, the objective is configured according to the invention so that the distance between subcomponents, which are moved relative to one another for adjusting the focal length, is selected sufficiently large. With this fitting of the focal length to the focal intercept, which is provided in the objective according to the invention preferably by the change in focal length while the focal intercept remains the same, the primary optical quantities of a conventional exchangeable objective can be adjusted and, in particular, the total magnification, the stereo impression and the object resolution can be optimized. It is also possible in the scope of the invention, however, that the fitting of the focal length to the focal intercept can be produced by changing the focal intercept while the focal length remains the same, as long as the user accepts the compromise that a change in the working distance is also produced thereby. In the case of objectives according to the invention, which have a construction according to the telescopic principle, the focal intercept as a rule deviates from the working distance by a small amount, in particular by a small amount [so as] to be larger than the working distance. In the case of objectives according to the retrofocus system, in contrast, the working distance, as a rule, is to be kept equal to the focal intercept. Since the focal intercept, however, in each case changes with a change in the working distance and to an extent equal to that of the working distance, different focal intercepts can be adjusted and the focal lengths can be fitted to these adjusted focal intercepts in the objective according to the invention, in which the working distance is variable.

According to a preferred embodiment, the objective includes in addition to the positive and the negative subcomponents at least one additional optical subcomponent, which is arranged on the optical axis of the objective at a distance to the second optical subcomponent of the objective, wherein at least two of the three subcomponents of the objective can be moved along the optical axis. The third subcomponent, which, as a rule, is connected downstream to the two subcomponents on the object side, i.e., is disposed on the side of the second subcomponent that is turned away from the object plane, represents a part of the objective and can be taken up in one housing with the other components of the objective. The subcomponents of the objective according to the invention are designed so that the beam bundles which exit from the third subcomponent in the direction of the observer, run parallel to one another. Due to this design, which can be influenced in particular by adjusting the optical system data, it is possible to exchange an objective of a conventional microscope for the objective according to the invention, or to exchange other components of the microscope.

In the objective of this embodiment, two distances or intermediate spaces, respectively, are created between the subcomponents of the objective, which make it possible according to the invention to vary the focal length of the objective while keeping the focal intercept the same and thus to create a zoom function in the objective.

Since at least two of the three subcomponents can be moved, the distances between the individual subcomponents can be adjusted independently of one another. This permits an optimal fitting of one of the distances to the other distance and in this way permits a precise adjustment of individual parameters of the objective.

In one embodiment, the zooming device includes an adjusting device for displacing at least one optical subcomponent of the objective along the optical axis of the objective. The adjusting device can be designed for either manual operation or an automated, motor-driven operation and can include the corresponding operating devices. Preferably, each of the subcomponents can be displaced individually by means of the adjusting device. Also within the scope of the invention, however, two subcomponents can be displaced simultaneously by the same amount by means of the adjusting device. For this purpose, appropriate engaging devices can be provided on the adjusting device, which selectively engage one or more subcomponents with the adjusting device and make possible a displacement of the subcomponent or the subcomponents. The adjusting device of the zooming device can be used with such a design also for the focusing of the objective. Structural simplifications can result hereby. The adjusting device can comprise, for example, a spindle construction.

As has already been mentioned, in the embodiment in which another optical subcomponent is provided in addition to the two subcomponents on the object side, at least two of the subcomponents are disposed so that they can be moved. Due to this construction of the objective, a continuous variation of the distances between the subcomponents can be achieved, and thus also a precise adjustment of individual parameters of the objective, which are adapted to other parameters.

Preferably, in an objective according to the invention, in which a third optical subcomponent is provided, a change in the relative position of the subcomponent of the objective on the object side can be conducted relative to the other two optical subcomponents for focusing. The distance between the second and the third subcomponents remains unchanged hereby. The focal intercept of the objective can be variably adjusted in the objective of this embodiment according to the invention, due to the change in the distance between the first and the second subcomponents.

For zooming, in an objective according to the invention, in which a third optical subcomponent is provided, in contrast, preferably two of the three optical subcomponents can be displaced independently of one another relative to a third subcomponent. Due to this design of the objective, the distances between the first and the second subcomponents as well as between the second and the third subcomponents can be varied and can be adjusted to the desired values independently of one another. In this way, the focal length can be adjusted, while the focal intercept can be kept constant.

In the objective according to the invention, the discrepancy between the focal length and the working distance, or the focal intercept, respectively, which exists in varioscopes, can therefore be eliminated. This leads to the fact that in the objective according to the invention, the primary optical quantities of the objective, if desired, can be adjusted to that of a system with fixed focal length. A zooming varioscope is thus created by the invention, with which it is possible to selectively utilize the advantages which are provided from the mode of operation of a varioscope or those which can be achieved with an objective with a fixed focal length. In addition, the user of the objective according to the invention can utilize not only the switching between an adjustment corresponding to a varioscope and an adjustment with a fixed focal length, but also intermediate stages between these two adjustments.

In one embodiment, a displacement path of at least 10 mm, preferably 15 mm, is provided between the first subcomponent on the object side and the second, adjacent optical subcomponent. In the objective according to the invention, it has been shown that in order to change the focal intercept by 307 mm, for example (FIG. 1), a change in the distance between the first and the second subcomponents by 18.8 mm may be necessary. For a change in the focal intercept by 302 mm, in another embodiment, a change in the distance of approximately 20 mm between the first and the second subcomponents may be necessary. In order to be able to supply a sufficient range of focal intercepts, in a preferred embodiment of the objective according to the invention, a displacement path of at least 10 mm is provided between these two subcomponents. The displacement path represents the path by which one of the two subcomponents can be moved on the optical axis, without coming into contact with another subcomponent of the objective, a housing of the objective, or another component of a microscope in which the objective is provided.

In one embodiment, the subcomponent on the object side possesses a negative refractive power. In this configuration, a positive subcomponent and another negative subcomponent are connected to this negative subcomponent, as observed from the object plane. With this embodiment, therefore, a part of the functional principle of a telescopic system is realized. In particular, focal lengths can thus be realized, which are basically longer in comparison to the focal intercept.

The user of the objective according to the invention of this telescopic system configuration can thus select between the advantages of the telescopic system and those of an objective with fixed focal length, depending on the requirements that arise at any moment. The total magnification and the stereo angle are reduced in telescopic systems, which can be perceived as a disadvantage. On the other hand, the sharpness of depth and the diameter of the object field are increased in comparison to an objective with fixed focal length.

In another embodiment, the subcomponent on the object side possesses a positive refractive power. In this configuration, in which a negative subcomponent, followed by another positive subcomponent, is connected to this positive subcomponent on the object side, a functioning principle of a retrofocus system is produced. In this way, focal lengths can thus be particularly adjusted, which are essentially smaller than the focal intercept. In this way, a total magnification can therefore be adjusted and a stereo angle which is fitted to this magnification can also be adjusted, as in the case of a retrofocus system. In comparison to the objective with fixed focal length, a reduced sharpness of depth and a reduced diameter of the object field result with the retrofocus system. If these properties are a disadvantage at any moment for the user, then he can again adjust the values of the objective with fixed focal length with the objective according to the invention.

According to one embodiment, at least one of the optical subcomponents includes a corrective component. This corrective component can serve for the purpose of optimizing the beam bundle with respect to the beam aberration.

The corrective component can represent a lens, for example, which is added to a subcomponent. Preferably, for example, in the embodiment in which a positive subcomponent is provided on the object side, a lens of negative refractive power is added to the negative subcomponent, when compared to a conventional retrofocus system.

The optical subcomponents of the objective according to the invention can represent cemented members and optionally may additionally comprise one or more single lenses. These single lenses are preferably combined with the cemented member, so that between these lenses and the cemented member, a structurally conditioned minimum distance exists, and in particular, the lenses cannot be moved independently of the cemented member.

The objective according to the invention, in one embodiment, may have a zoom factor of the lens magnification of at least 1.1, preferably of at least 1.2. Due to this zoom factor, advantages result for the design of a microscope, in which the objective according to the invention is used. These advantages are explained more precisely in the following with reference to the microscope according to the invention.

According to another aspect, the object which is the basis of the present invention is solved by a microscope, which has an objective with the construction according to the invention. In particular, the object is thus solved by a microscope which comprises an objective which has a zooming device. Operating means can be provided on the microscope for operating the zooming device.

The microscope according to the invention can be, for example, a stereomicroscope, in particular a stereomicroscope according to the telescopic principle. Particularly preferred, the microscope according to the invention represents an operating microscope. The advantages of the microscope according to the invention can be ideally utilized in the case of an operating microscope.

According to one embodiment, the microscope according to the invention can have a control unit for adjusting different operating modes, wherein the control unit can particularly have a control loop. By selecting an operating mode, then actuating devices can be controlled, in particular, for displacement of one or more subcomponents, and the subcomponent or subcomponents can be moved so that the display desired by the user of the microscope is attained.

The operating modes among which the user can select and among which can be changed by the control unit are, for example, operation of the objective of the microscope with the optical quantities of an exchangeable objective with a fixed focal length and operation with the optical quantities of a varioscope. Intermediate modes can also be adjusted.

Switching between the modes is simplified for the user by the control unit, which carries out the positional changes of the subcomponents of the objective, which are necessary for adjusting the different modes. In this way, a manual adjustment of the position of the individual components relative to one another need not be performed by the user. Thus, the user can obtain in a simple way the usual standard for the primary optical quantities of exchangeable objectives, but without the need for dispensing with the advantages of the telescopic system or the retrofocus system, respectively.

In particular, the control unit can contain a control loop for controlling any functional dependence—which can be given in advance—of the focal length to the focal intercept of the objective of the microscope. A focal length corresponding to the mode which can be preset can be adjusted for any focal intercept by means of this control. For example, for a selected working distance, the primary optical quantities of an exchangeable objective can be adjusted by adjusting the difference to a minimum, in particular to less than 50 mm, preferably to less than 20 mm, more preferably to less than 10 mm and most preferably to 0 mm. The user of the objective need undertake no further manual adjustments to the objective for this purpose.

However, in addition to the control unit, manual actuating means can also be provided within the scope of the invention, by means of which the user can undertake adjustments to the objective. These manual actuating means are preferably configured in such a way that one serves for adjusting a working distance and another serves for adjusting the focal length of the objective. In particular, the distance between a subcomponent on the object side and a subcomponent adjacent to it can be adjusted by means of the actuating means for adjusting the working distance. In contrast, both the distance between the subcomponent on the object side and the second subcomponent adjacent to it as well as the distance between the second subcomponent and a third subcomponent can be adjusted by the actuating means for adjusting the focal length, whereby both of these distances are changed simultaneously.

The control unit and the actuating means can act in coordination with the above-named adjusting means of the objective. It is also possible, however, that the actuating means of the microscope simultaneously represents the adjusting means of the objective.

This control unit can have an operating unit, in which, for example, the possible operating modes are displayed in a menu for the user or as buttons for making selections.

Based on the construction of the objective according to the invention in the microscope, in the case of a microscope which has an afocal zooming system, the zoom factor, i.e., the variation of the total magnification of the microscope, is now the product of the zoom factor of the lens magnification of the zooming varioscope and the zoom factor of the telescopic magnification of the afocal zooming system connected downstream of the objective. Due to this division of the zoom factor, it is thus possible to expand the total magnification clearly beyond the usual magnification range with relatively small additional expenditure. On the other hand, however, a zoom factor that can be attained with a conventional microscope can also be maintained, but in the microscope according to the invention, the zoom factor of the afocal zooming system can be reduced hereby. Based on this smaller zoom factor, which then must be provided by the afocal zooming system, advantages result with respect to the structural length. However, the brightness, the object resolution and similar parameters are also improved. The advantages essentially result in the fact that in a microscope according to the invention the change in the lens magnification of the objective is caused by an apparent change of the object distance, whereas the telescopic magnification must be viewed as an optical post-magnification of the image content taken up by the objective and thus must be interpreted somewhat differently. If the zoom factor of the lens magnification (LM=250/f) is adjusted to 1.6 and the zoom factor of the afocal zooming system amounts to 5, then a factor of 8 can be achieved for the total magnification. In contrast, for example, if a zoom factor of 6 of the microscope is to be maintained, then for example, the zoom factor of the lens magnification LM can be adjusted to 1.5, which permits a reduction of the zoom factor of the telescopic magnification to 4, whereby the above-mentioned advantages can be obtained.

In the objective according to the invention, the zooming device integrated in the objective serves only for fitting the focal length to an adjusted working distance. By means of this adjustment, for example, the focal lengths are adjusted to the value of the working distance and thus the properties of an exchangeable objective with a fixed focal length are delivered. Each time depending on the construction of the objective according to the invention, however, due to this fitting, optimal ratios of the working distance to the focal length can also be adjusted, in order to be able to utilize the advantages of a retrofocus system or of a telescopic system, respectively. The range of focal lengths which must be covered with the objective in the case of an adjusted working distance is thus relatively small. In this way, the distances between the individual subcomponents of the objective can also be kept small, whereby advantages result relative to the structural length of the objective.

In one embodiment, the microscope according to the invention includes a digital image processing device. In such a digital microscope, which can be utilized advantageously, for example, for operating purposes, the optical systems are not fitted to the resolving capacity of the eye for a visual observation, thus for a fixed image angle, but are fitted to the specifications of the image processing device. Here, microscopes are designed to fulfill requirements such as, for example, pixel size and chip diagonal, that relate to parameters such as, for example, focal length, lens diameter, numerical aperture and image field. Individual components of the microscope can be dimensioned smaller for this reason. Thus, for example, a conventional afocal zooming system for a microscope, which is combined with a digital image processing device, can be reduced by a factor of 2 in its structural length and also in its lens diameter.

In the configuration of the microscope according to the invention as a digital microscope, which has a digital image processing device, the objective can be constructed according to the retrofocus system. In this embodiment, the advantages which can be achieved with the objective according to the invention can be utilized particularly advantageously. With this objective, the focal length can be made one-half of the focal length of an objective according to the telescopic system. Thus, when the stereo angle remains unchanged so that the stereo impression is also unchanged, the stereo base can be cut in half, which is mechanically possible due to the smaller lens diameter of the afocal zooming system of a digital operating microscope. If, for example, a focal length of 273 mm can be obtained in a telescopic system, then with the corresponding retrofocus system, a focal length of 135 mm can be adjusted. With an unchanged stereo angle of 4.6 degrees, the stereo base can be reduced in this case from 22 mm to 11 mm.

In this way, new uses result for a zooming varioscope of the retrofocus system, which, as a rule, was little used as opposed to a telescopic system, due to the large structural volume and the limitations resulting therefrom, for dealing with optimization of weight and cost in an operating microscope.

In the microscope according to the invention, as in conventional microscopes, individual components can be exchanged, since in the zooming varioscope utilized in the microscope, the beam bundles which exit from it run in parallel. Thus, for example, the afocal zooming system can be replaced by a Galilean-type changer or, instead, for ergonomic reasons, a straight tube can be replaced by an inclined tube or a pivoting tube.

The invention also concerns a method for adjusting an objective of an observation device, wherein the objective has at least three optical subcomponents on a common optical axis and the subcomponents are disposed at distances relative to one another, whereby the method is hereby characterized in that for adjusting the focal intercept of the objective, one of the distances between two adjacent subcomponents is changed and the other distance is kept constant. In this way, it is possible to adjust the focal intercept independently of the zooming position of the objective. Preferably, for the adjustment of the focal intercept, the distance between the first subcomponent on the object side and the second subcomponent is varied and the distance between the second and the third subcomponents is kept constant.

For adjusting the focal length of the objective with constant focal intercept, i.e., for zooming, according to the invention, the distance between the first and the second subcomponents as well as the distance between the second and the third subcomponents can be varied independently of one another. In the sense of the invention, an independent adjusting of the distances between each of two adjacent subcomponents means that the two distances can be changed by different amounts. It is possible, however, according to the invention that these changes in distance are carried out simultaneously.

The advantages and features, which have been described relative to the objective are valid—insofar as they are applicable—also for the microscope and the method, and vice versa.

Additional details and advantages of the objective according to the invention, the microscope according to the invention, and the method according to the invention result from the following description and the drawings belonging thereto. Here:

DETAILED DESCRIPTION OF PREFERRED EMBODIMENTS

The invention will be explained in more detail in the following on the basis of several embodiment examples. For better understanding, first with reference to FIGS. 4 to 6, the construction principle of a stereomicroscope and the beam paths will be explained in objectives of the prior art.

Figure 4:
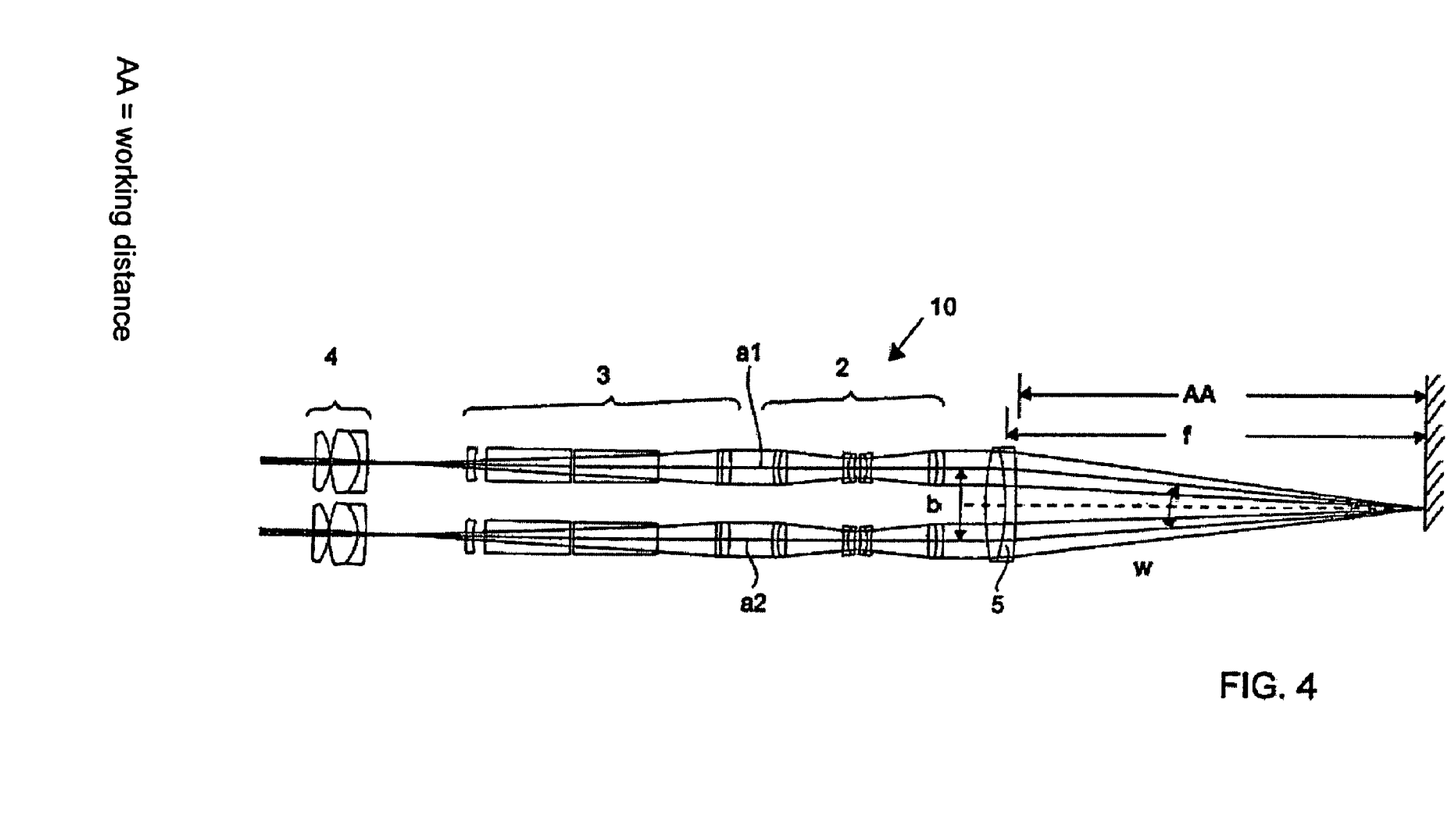
FIG. 4 shows the schematic construction of a stereoscopic microscope.

A stereomicroscope 10, which is constructed according to the telescopic principle and can find use in an objective according to the invention is schematically represented in FIG. 4.

The microscope 10 essentially comprises the following components, when observed from the object side: a principal objective 5, an afocal zooming system 2, a tube 3, as well as the eyepiece 4. The two stereo channels of the binocular telescopic tube comprised of tube 3 and eyepiece 4 each have a common optical axis a1 or a2, respectively. The distance between these two axes is denoted the stereo base b and the angle at which the object is observed via the common principal objective 5, is designated the stereo angle w.

The dependence of several primary optical quantities on the focal length of the objective 5 will be clarified in the following.

In a microscope 10, the stereoscopic image impression results from the condition such that the object found in the front focal length of the objective 5 with the focal length f is imaged to infinity in two stereoscopic image parts. These image parts are introduced to the observer by means of the two identical optical channels of the zooming system 2 and of the binocular telescopic tube 3 and eyepiece 4. The stereo angle w determining the stereo impression is inversely proportional to the focal length f of the objective.

In a standard design of the microscope, which can have the construction of the microscope 10 shown in FIG. 4, a stereo angle w=6.3 degrees results in the case of a stereo base b=22 mm and a focal length f=200 mm. The stereo angle and thus the stereo impression are correspondingly reduced to w=3.15 degrees for a focal length of f=400 mm.

With a standard set-up for the microscope 10, for example, as an operating microscope, with an afocal 6× zoom, a tube of 170 mm, an eyepiece of 10× and a principal objective of f=200 mm, there results a total magnification of M=3.4–20.4. When one objective is changed to an objective 5 with a focal length of f=400 mm, one obtains a total magnification of M=1.7–10.2.

In FIG. 4, an objective with a fixed focal length is shown as the objective 5, which is comprised of a single cemented member. In the case of such an objective 5, the working distance AA is approximately equal to the focal intercept s of the objective 5. The focal length f, which represents the distance of the object plane to the principal plane H is approximately equal here in magnitude to the focal intercept s.

Figure 5:
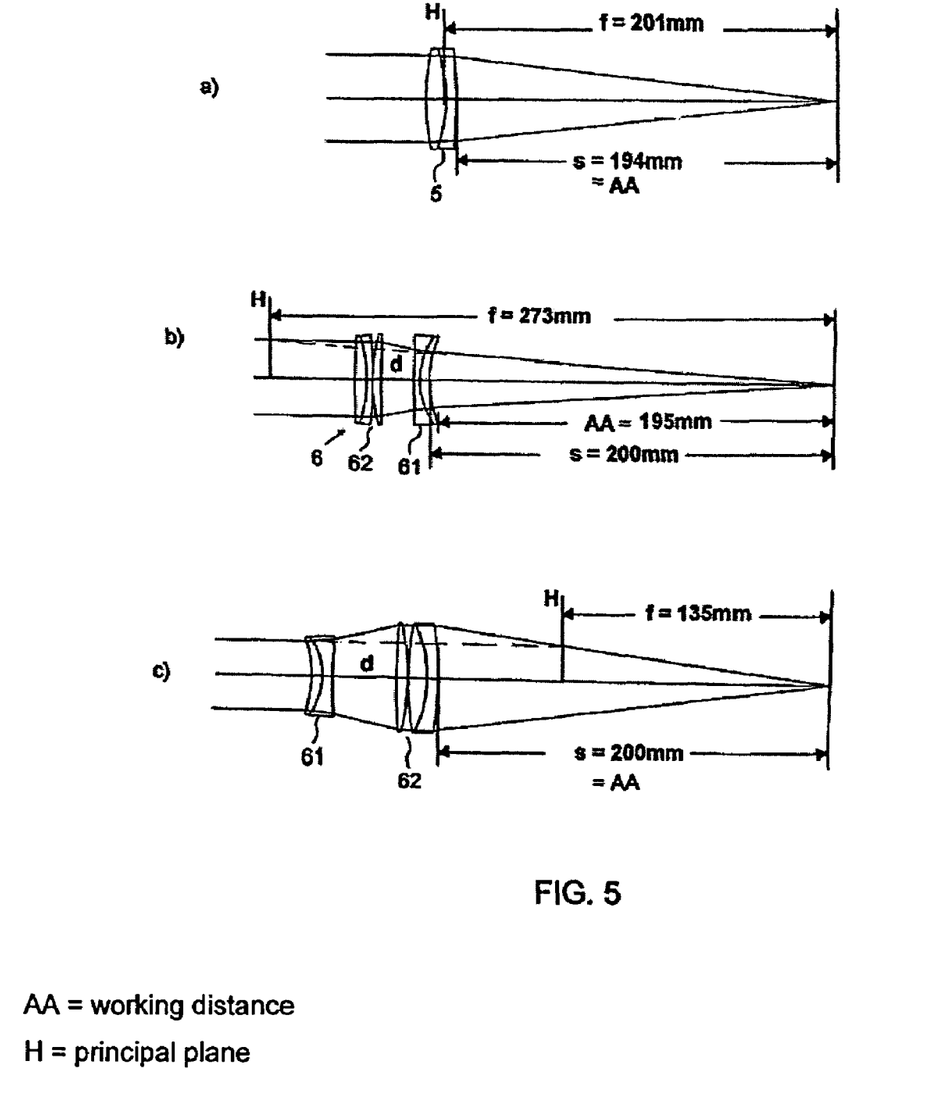
FIGS. 5a to 5c show schematic representations of the beam paths in objectives of different construction.

Objectives of different construction are shown in FIG. 5. It results from FIG. 5a that on a standard exchangeable objective 5, which is comprised of a single cemented member, with the focal length of f=201 mm, there is present a focal intercept s and thus also a working distance of approximately 194 mm. The principal plane H thus lies in the vicinity of the lens vertex on the object side.

FIG. 5b shows a varioscope according to the telescopic system and FIG. 5c shows a varioscope according to the retrofocus system.

In a varioscope 6 which is configured according to the telescopic system, a negative optical subcomponent 61 is provided on the object side, as indicated in FIG. 5b, to which a positive subcomponent 62 is connected in the direction of the observer. In the embodiment shown, the negative subcomponent 61 is formed from a single cemented member and the positive subcomponent 62 is comprised of a cemented member and a single lens. The two optical subcomponents 61, 62 are disposed with a distance d between them along the optical axis of the varioscope 6. With an objective 6 of this construction, one obtains a focal length of f=273 mm in the case of a working distance AA of approximately 195 mm. In contrast to the exchangeable objective 5, thus in the case of a telescopic system, the focal length f is larger than the focal intercept s and thus larger than the working distance AA, which corresponds approximately to the focal intercept and amounts to approximately 195 mm in the case of the varioscope 6 which is shown.

FIG. 5c shows the second variant of a varioscope 6. This has the construction according to the retrofocus system and is comprised of a positive optical subcomponent 62 on the object side and a negative optical subcomponent 61 connecting thereon. In the embodiment shown, the negative subcomponent 61 is formed from a single cemented member and the positive subcomponent 62 is comprised of a cemented member with a single lens. With an objective of this construction the focal length f=135 mm in the case of a working distance of 200 mm, which is equal to the focal intercept s.

It results from FIG. 5 therefore, that for the telescopic system, a focal length is obtained that is longer by a factor of 2 than for the retrofocus system.

Figure 6:
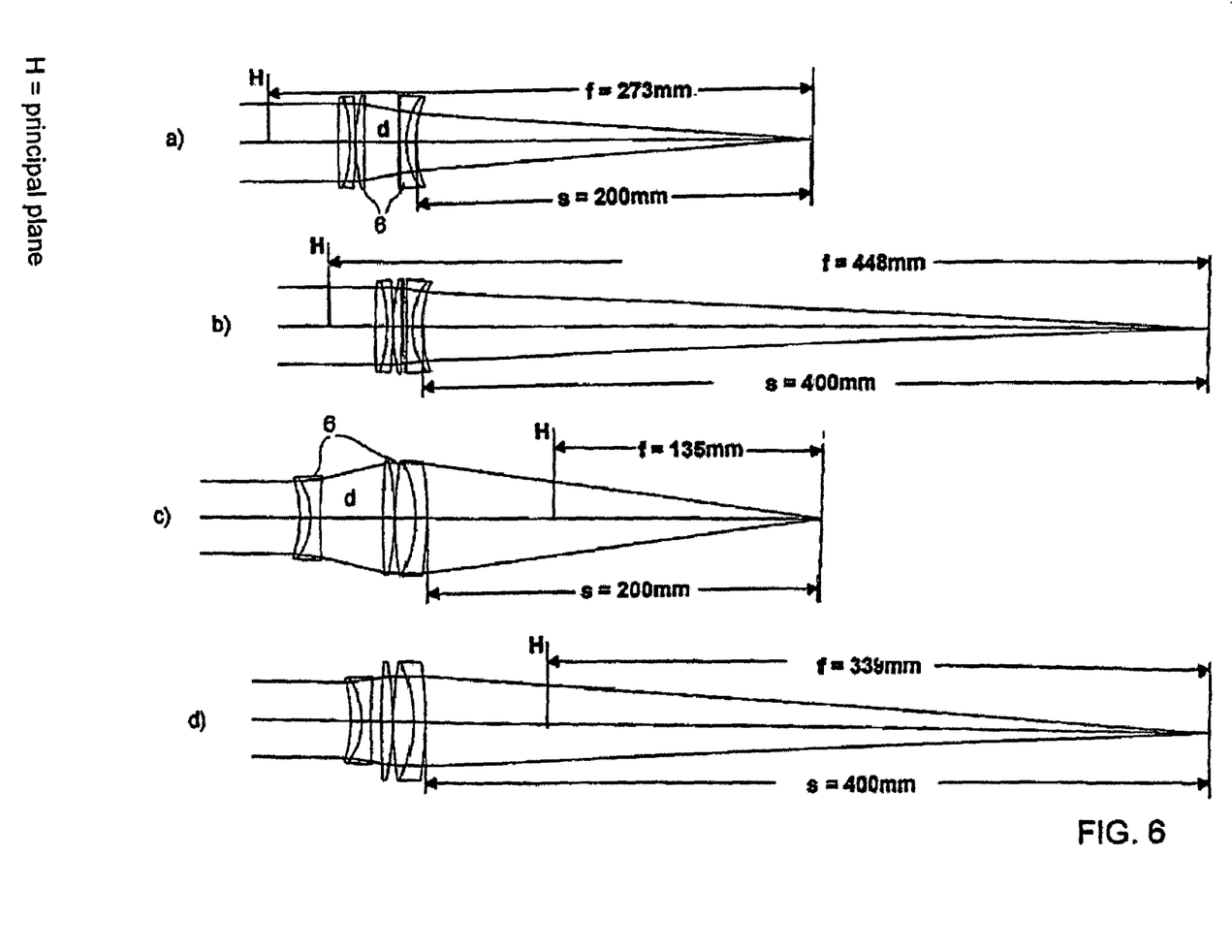
FIGS. 6a to 6d show adjustment of the focal intercept in varioscopes of different construction.

In the case of varioscopes, the focal intercept s and thus the working distance AA, which is substantially equal to the focal intercept s, can be changed by a change in the distance d. This is indicated schematically in FIG. 6. A telescopic system is shown in FIGS. 6a and 6b, in which two different working distances of 200 mm and 400 mm were adjusted. The increase in the working distance was achieved by reducing the distance d between the two subcomponents from d=17.4 mm to d=1.6 mm. In this way, the focal length increases correspondingly from f=273 mm to f=448 mm; and thus it is longer in both adjustments than the respective working distance AA.

Also in the case of the varioscope according to the retrofocus system, an increase of the focal intercept s and thus of the working distance AA of the same magnitude from 200 mm to 400 mm is obtained in the case of a reduction in the distance d between the two subcomponents 61, 62. Here, the distance d must be changed by a larger amount than in the case of a telescopic system. In the embodiment represented, a reduction of the distance d from d=32.2 mm to d=5.4 mm must result for this change in the working distance AA. The structural length of the retrofocus system is thus essentially longer than that of a telescopic system for the same working distance range. The focal length of the varioscope according to the retrofocus system is smaller in this case than the respective working distance, in the case of both focusing positions, i.e., in the two adjustments of the working distance AA. This means that the principal plane H lies between the objective 6 and the object plane. In the embodiment shown, with a focal intercept s and a working distance of 200 mm, the focal length f=135 mm, and at a working distance of 400 mm, f=339 mm approximately.

Figure 1:
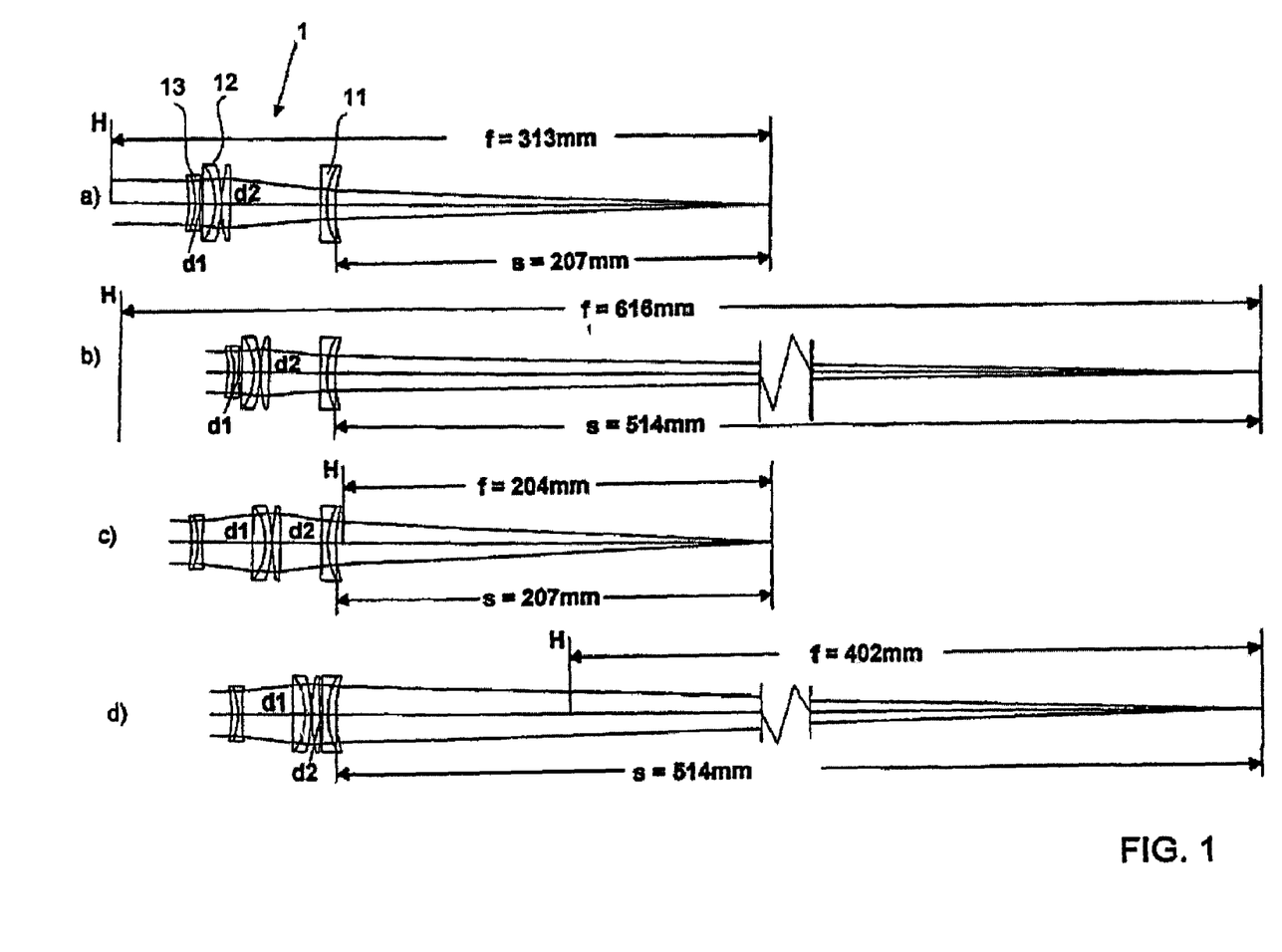
FIGS. 1a to 1d show schematic representations of the beam paths in an objective according to the invention according to a first embodiment.
Figure 2:
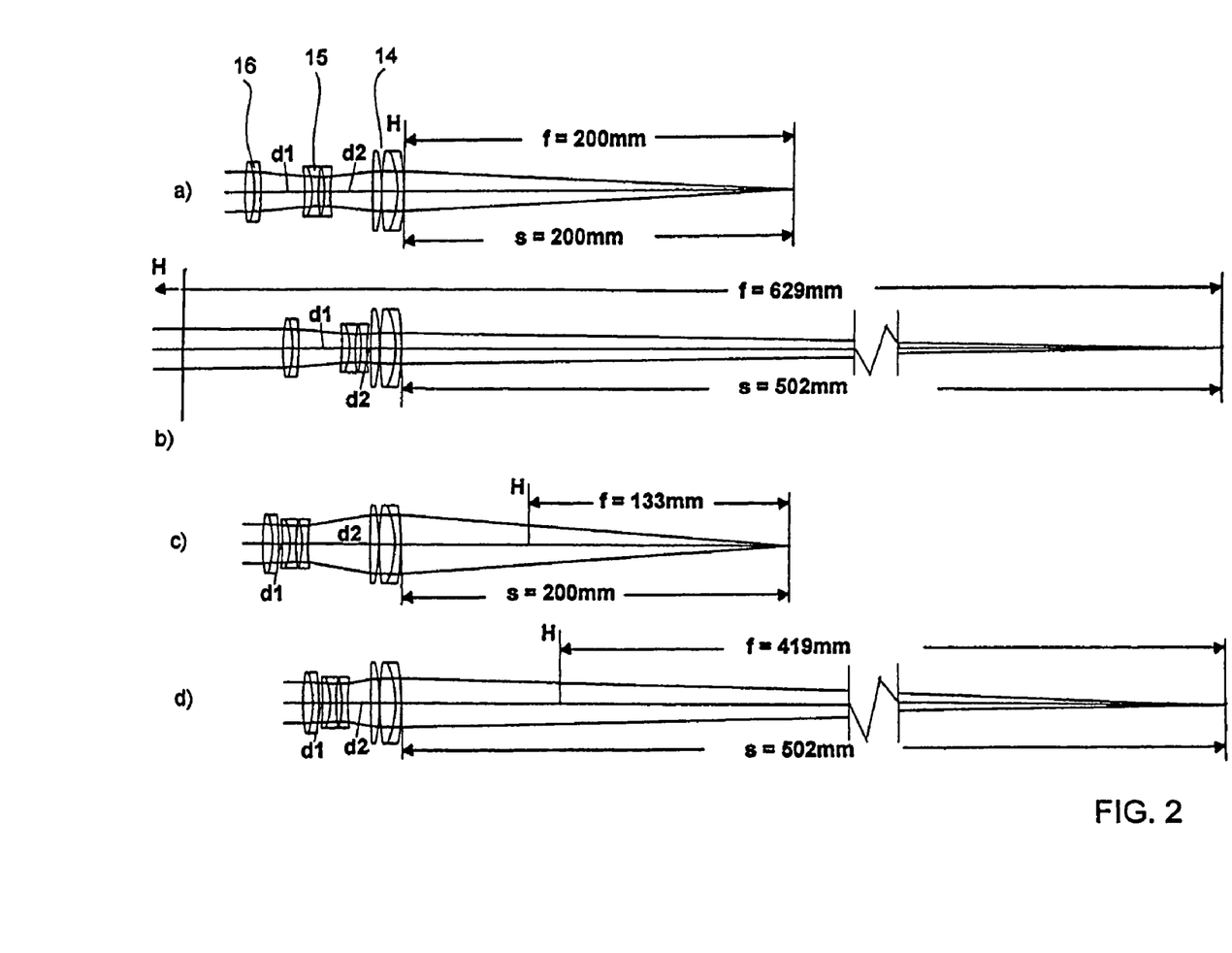
FIGS. 2a to 2d show schematic representations of the beam paths in an objective according to the invention according to a second embodiment.
Figure 3:
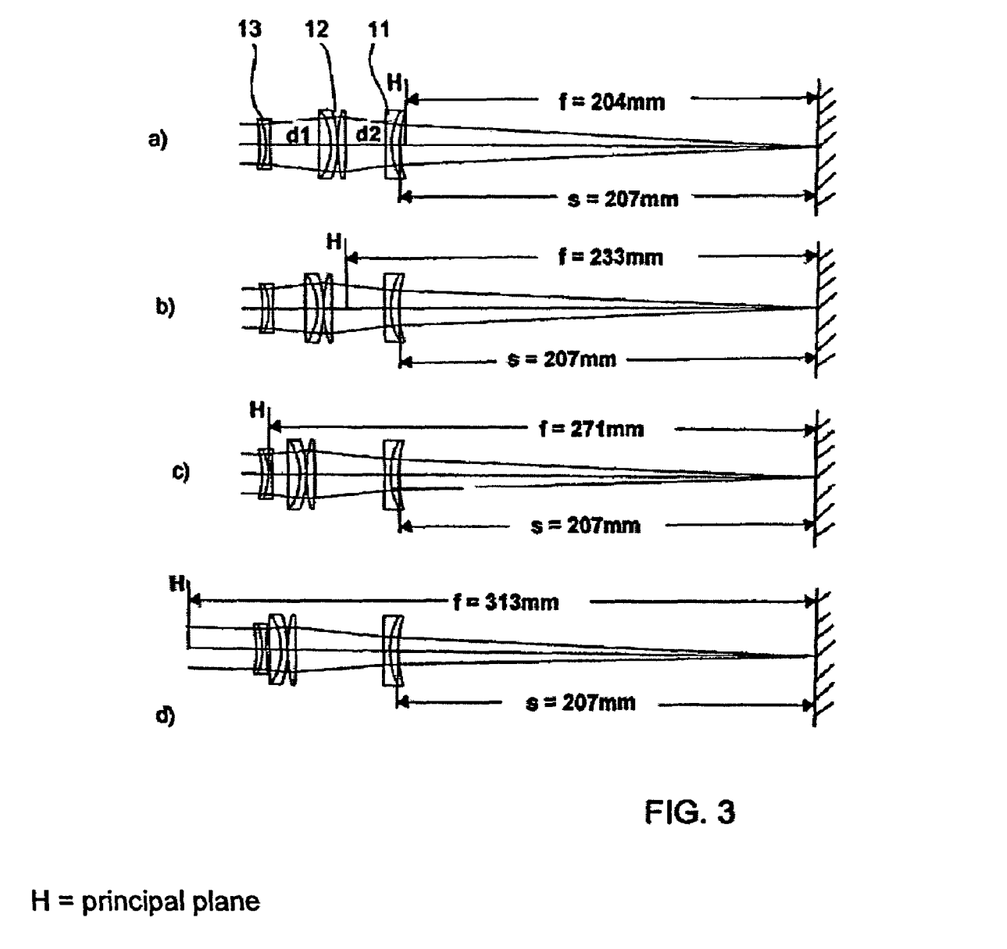
FIGS. 3a to 3d show schematic representations of the beam paths in an objective according to the invention according to the first embodiment in different zooming adjustments.

Embodiments of the objective according to the invention, which is denoted also as a zooming varioscope, will now be described more precisely in FIGS. 1 to 3. Embodiments of the objective according to the invention are shown in FIGS. 1 and 2. A zooming varioscope 1 according to the invention, which is constructed according to the telescopic system, is shown in FIG. 1. Here, the objective 1 is comprised of a negative subcomponent 11 on the object side and a positive subcomponent 12 connecting thereto. To this extent the construction of the objective 1 according to the invention corresponds substantially to that of a conventional varioscope 6, which is shown, for example, in FIG. 5b. On the side of the observer, this construction is expanded, of course, by another negative subcomponent 13. This is formed by a cemented member in the embodiment shown. A distance d2 is provided between the first subcomponent 11 and the second subcomponent 12 and a distance d1 is provided between the second subcomponent 12 and the third subcomponent 13. These distances d1 und d2 can be adjusted independently of one another.

On the one hand, the focal intercept s and thus the working distance AA, which substantially corresponds to the focal intercept s in this embodiment, can be changed due to this construction. On the other hand, due to the construction according to the invention, however, the focal length f may also be changed, without the focal intercept s being changed. The objective 1 according to the invention acquires a zoom function at constant focal intercept s due to the adjustment of the focal length f.

The mode of operation of this embodiment of the objective 1 according to the invention and the method according to the invention will now be explained in more detail with reference to FIGS. 1a to 1d. The focal intercept s is changed by changing the distance d2 between the negative subcomponent 11 on the object side and the adjacent positive subcomponent 12. In this way the distance d1 between the positive subcomponent 12 and the third negative subcomponent 13 is kept constant. In the embodiment shown, the focal intercept s can thus be increased from 207 mm to 514 mm by changing the distance d2 from 43.4 mm to 24.6 mm. The distance d1 is hereby kept constant at 1.5 mm. In both adjustments of the focal intercept s, the focal length f is larger than the focal intercept s, i.e., the principal plane H lies behind the objective 1.

If the distance d2 between the first subcomponent 11 on the object side and the adjacent subcomponent 12 as well as the distance d1 between the second subcomponent 12 and the third subcomponent 13 are changed simultaneously in a well-defined manner, from the adjustment shown in FIG. 1a, then the focal length f can be changed while the focal intercept s remains the same. The focal length f can be changed until it corresponds to the focal intercept s. Thus, the primary optical quantities of an exchangeable objective can be adjusted. This adjustment is shown in FIG. 1c, for example, for a working distance of 200 mm. In this way, the focal length f=204.1 mm and the focal intercept s=207 mm in the case of a distance d1=24.0 mm and a distance d2=19.8 mm.

If the distance d2 is changed again from the adjustment shown in FIG. 1c, particularly if it is reduced, while the distance d1 remains constant, then an enlargement of the focal intercept can again be attained. In the embodiment shown, an increase of the focal intercept from 207.0 mm to 513.5 mm is produced with a change of d2 from 19.8 mm to 1.0 mm. The distance d1 is hereby kept constant at 24 mm (FIG. 1d). Also, the focal lengths, as in the case of an objective with a fixed focal length, can now be adjusted to 513.5 mm for this focal intercept of 513.5 mm, by means of zooming, thus a fitted variation of the distances d1 and d2, and the focal length can thus be made equal to the focal intercept, since in the case of this focal intercept, the zooming range lies between f=402 mm (FIG. 1d) and f=616 mm (FIG. 1b).

It is thus possible with this embodiment of the objective according to the invention to vary continuously between a focal length which corresponds to that of an exchangeable objective with a fixed focal length and a focal length, which is obtained with a varioscope according to the telescopic system. This zooming range makes it possible for the user of the objective or of the microscope, respectively, in which such an objective is contained, to alternatively utilize the advantages of both types of objectives. In addition, the user can fit the focal intercept s of the objective to the requirements needed at any moment. This is possible in the objective according to the invention, since the zooming function and the focusing function are independent of one another.

Another embodiment of the zooming varioscope 1 according to the invention is shown in FIG. 2. In this embodiment, the objective 1 is comprised of a positive subcomponent 14 on the object side, and an adjacent, negative subcomponent 15 to which another positive subcomponent 16 is connected at a distance. The positive subcomponent 14 on the object side and the negative subcomponent 15 arranged at a distance d2 thereto correspond essentially to the construction of a conventional varioscope according to the retrofocus system. Of course, in the embodiment shown, for reasons of optical correction, an additional negative lens is provided, by which the negative cemented member of a retrofocus system was expanded.

In the position of the subcomponents 14, 15, 16 relative to one another, which is shown in FIG. 2a, the focal length f of the objective 1 is equal to the focal intercept s and lies at 200 mm. Now, if the distance d1 between the second subcomponent 15 and the third subcomponent 16 is kept constant, and the distance d2 between the first subcomponent 14 and the second subcomponent 15 is reduced, then the focal intercept s is increased to 502 mm and the focal length is increased to 629 mm. This adjustment is shown in FIG. 2b.

If, in contrast, the focal length f is to be changed while the focal intercept s remains the same, i.e., will be zoomed, then both the distance d1 as well as the distance d2 will be changed. The amount of the changes in distances d1 and d2 can be different. These amounts, however, are fitted to one another. By a targeted fitting of the distances, for example, an adjustment can be obtained, which is shown in FIG. 2c. The focal intercept s is kept constant at 200 mm as opposed to the position in FIG. 2a, and the focal length f is, of course, shortened to 133 mm.

In this position, the primary optical quantities, which could be obtained with a conventional retrofocus system, can be obtained. If the focal intercept s is to be changed from this adjustment, then the distance d1 between the second and third optical subcomponents 15, 16 will be kept constant again and only the distance d2 between the first subcomponent 14 and the second subcomponent 15 will be changed. In this way, for example, a focal intercept of 502 mm can be adjusted in the case of a focal length of 419 mm (FIG. 2d). For this focal intercept of 502 mm, the focal length, as in the system with a fixed focal length, can also be adjusted to 502 mm, as in the case of the telescopic system (FIG. 1), by zooming (thus a fitted variation of the distances d1 and d2), since the zooming range for the focal intercept of 502 mm lies between f=419 mm (FIG. 2d) and f=629 mm (FIG. 2b).

As results from FIGS. 1 and 2, the zooming function of the objective 1 is thus decoupled from the focusing function of the objective 1. This is illustrated still further by FIG. 3, in which, for a working distance AA of approximately 200 mm, exactly for a focal intercept of s=207 mm, different zooming positions of a zooming varioscope 1 according to the invention according to the telescopic system are shown. The distances d1 and d2 and the correspondingly obtained focal lengths are found in Table 1.

TABLE 1

|  | d1 (mm) | d2 (mm) | f (mm) | s (mm) |
|---|---|---|---|---|
| FIG. 3a | 24.0 | 19.8 | 204.1 | 207.0 |
| FIG. 3b | 16.0 | 26.1 | 232.8 | 207.0 |
| FIG. 3c | 8.0 | 34.4 | 270.9 | 207.0 |
| FIG. 3d | 1.5 | 43.4 | 312.5 | 207.0 |

As has already been explained with reference to FIGS. 1 and 2, by only changing the distance d2 between the first and the second subcomponents, a change in the focal intercept in different zooming positions can be achieved. The values for d1 and d2, which must be adjusted in the different zooming positions of FIG. 3, are given in Table 2, in order to obtain the corresponding focal length f with a constant focal intercept s of 513.5 mm. As results from Tables 1 and 2, in the case of the embodiment shown, the distance d2 in each zooming position must be reduced constantly by 18.8 mm for a change in focal intercept from 207.0 mm to 513.5 mm. Since this corresponds to the focusing range, which is required for microscopes, in particular operating microscopes, a displacement path of at least 18.8 mm is provided preferably between the first subcomponent and the second subcomponent.

TABLE 2

| d1 (mm) | d2 (mm) | f (mm) | s (mm) |
|---|---|---|---|
| 24.0 | 1.0 | 402.1 | 513.5 |
| 16.0 | 7.3 | 458.6 | 513.5 |
| 8.0 | 15.6 | 533.7 | 513.5 |
| 1.5 | 24.6 | 615.6 | 513.5 |

Figure 7:
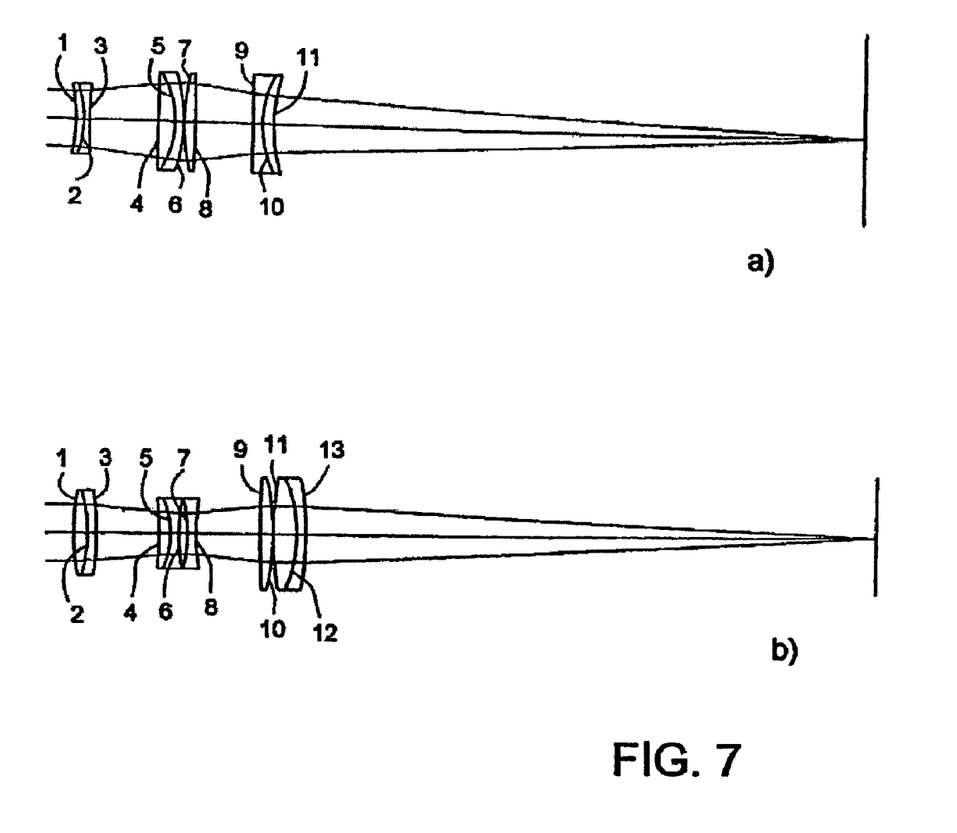
FIGS. 7a and 7b show schematic representations of the objectives according to the invention according to the first and the second embodiments with numbering for optical design.

In the appended Table 3, optical system data are given, which have proven suitable for the design of an objective 1 according to the telescopic system according to the invention. In the appended Table 4, corresponding optical system data are given for an embodiment of an objective 1 according to the invention according to the retrofocus system. The surfaces assigned to the numbers are taken from FIG. 7, wherein FIG. 7a refers to Table 3 and FIG. 7b to Table 4.

The values given in the tables only represent examples of the objective according to the invention. The invention, however, is not limited to objectives with these optical system data.

In the case of exchangeable objectives, the focal length which is also practically equal in magnitude to the working distance AA has been established and a very specific standard has been coined by long years of practical experience for the functional primary optical quantities dependent on focal length, such as total magnification, stereo angle, diameter of the object field, resolution of the object, and depth of sharpness.

In fact, by the use of varioscopes in an optimal manner, a change in working distance without a change of objective could already be established over the entire operating range of practical requirements, but relative to specific primary optical quantities, the usual standard based on exchangeable objectives could not always be fulfilled to the complete satisfaction of the user. For experienced users, but also in a direct comparison, these differences are clearly visible relative to the total magnification, the stereo impression, and the object resolution. It should be remembered that two additional important quality criteria of optical imaging are associated with the object resolution, namely brightness of the image and in a general, ideal manner, the so-called "crisp" image impression. On the other hand, it has also been shown that the experienced user sees the enlargement of the object field diameter and the increased depth sharpness by means of the varioscope as an advantage and will reluctantly give up this advantage.

With the present invention, several of these disadvantages of the varioscopes of the prior art can now be eliminated and simultaneously their advantages can be ideally utilized. A very decisive advantage of the zooming varioscope according to the present invention consists of the fact that the user can switch between the two modes (exchangeable objective and varioscope) in a simple way. Thus he obtains again the standard for the primary optical quantities that is usual for exchangeable objectives, but without the need for dispensing with the respective advantages of the telescopic system or of the retrofocus system.

In addition, the objective according to the invention has the advantage that the transition from varioscope to zooming varioscope can be effected with minimum increased expenditure. In the case of the zooming varioscope according to the telescopic system, as a rule, in comparison to the conventional varioscope, only one additional optical subcomponent, for example, in the form of a cemented member, is to be provided, and in the case of a zooming varioscope according to the retrofocus system, the provision of a cemented member and optionally, an additional corrective member can be sufficient.

It is also advantageous that by well-defined simultaneous independent variation of the two distances d1 and d2 of the respective adjacent optical subcomponents, a continuous change in the total magnification can be achieved with the focal intercept remaining the same, so that the zoom function of the afocal zooming system in a microscope can be expanded by the zoom function of the varioscope.

In addition to new approaches for improvement in the use of the conventional operating microscope, an important building block for the successful conversion of user-compliant innovations will also be created by the present invention, innovations such as are made possible by new technologies, for example, in the case of digitization of the optical imaging systems of the operating microscope.

TABLE 3

| No. | Radius (mm) | Thickness or air distance (mm) | Glass or medum | Free diameter (mm) |
|---|---|---|---|---|
| 1 | −60.8151 | | | 25.0 |
| 2 | −34.0038 | 3.0 | SF57 | 25.0 |
| 3 | 128.042 | 2.0 | NBAF52 | 25.0 |
| | Air distance L1 | 24.0 ... 1.5 | | |
| 4 | 3778.67 | | | 35.0 |
| 5 | −31.5191 | 6.0 | NPSK53 | 35.0 |
| 6 | −56.4034 | 3.0 | SF57 | 35.0 |
| 7 | 70.5998 | 0.1 | Air | 35.0 |
| 8 | −375.588 | 4.0 | NPSK53 | 35.0 |
| | Air distance L2 | 43.4 ... 1.0 | | |
| 9 | −756.803 | | | 35.0 |
| 10 | 37.2013 | 3.0 | NSSK8 | 35.0 |
| 11 | 59.9141 | 4.0 | NSF56 | 35.0 |
| | | 207.0 ... 513.5 Object plane | | |

TABLE 4

| No. | Radius (mm) | Thickness or air distance (mm) | Glass or medum | Free diameter (mm) |
|---|---|---|---|---|
| 1 | 89.2865 | 5.0 | NSSK8 | 30.0 |
| 2 | −51.3582 | 3.0 | NSF6 | 30.0 |
| 3 | −127.494 | | | 30.0 |
| | Air distance L1 | 2.0 ... 22.0 | | |
| 4 | −119.167 | 4.0 | NSF6 | 25.0 |
| 5 | −31.0930 | 3.0 | NPSK53 | 25.0 |
| 6 | 78.3292 | 3.0 | Air | 25.0 |
| 7 | −50.5392 | 3.0 | NSK2 | 25.0 |
| 8 | 86.7902 | | | 25.0 |
| | Air distance L2 | 32.0 ... 2.0 | | |
| 9 | 384.992 | 4.5 | NPSK52 | 40.0 |
| 10 | −91.5256 | 0.1 | Air | 40.0 |
| 11 | 131.158 | 8.0 | NPSK53 | 40.0 |
| 12 | −51.1120 | 3.0 | SF57 | 40.0 |
| 13 | −117.426 | | | 40.0 |
| | | 200.0 ... 502.3 Object plane | | |

List of Reference Numbers
10 Microscope
1 Zooming varioscope
11 Negative subcomponent
12 Positive subcomponent
13 Negative subcomponent
14 Positive subcomponent
15 Negative subcomponent
16 Positive subcomponent
2 Afocal zooming system
3 Tube
4 Eyepiece
5 Principal objective (with fixed focal length)
6 Varioscope
61 Negative subcomponent
62 Positive subcomponent
f Focal length
s Focal intercept
AA Working distance
d1 Distance between second and third subcomponents
d2 Distance between first and second subcomponents
w Stereo angle
b Stereo base
a1, a2 Optical axes (tube)

The invention claimed is:

1. An objective for an operating microscope, wherein the objective is designed so that an imaging is produced with it from finite to infinite and wherein the objective comprises an objective-lens-system, which consists of a first optical subcomponent on the object side, a second optical subcomponent, and a third optical subcomponent, wherein the second optical subcomponent is arranged at a distance to the first optical subcomponent on the optical axis of the objective and one of the first and second optical subcomponents possesses a positive refractive power and the other of the first and second optical subcomponents possesses a negative refractive power, wherein the third optical subcomponent is arranged on the optical axis of the objective at a distance to the second optical component of the objective, wherein two of the optical subcomponents can be moved along the axis, wherein the working distance of the objective is variable, wherein the focal length can be varied independently of the working distance, wherein the objective has a zooming device, wherein the second optical subcomponent and the third optical subcomponent can be moved relative to each other and relative to the first optical subcomponent, wherein one of the second and third optical subcomponents has a positive refractive power and the other of the second and third optical subcomponents has a negative refractive power and wherein, for focusing, a change in the relative position of the subcomponent of the objective on the object side can be conducted relative to the other two optical subcomponents.

2. The objective according to claim 1, further characterized in that the objective is configured in such a way that ratios of focal length to working distance can be adjusted in the range of 0.4 to 1.5 or is configured in such a way that ratios of focal length to working distance can be adjusted in the range of 0.5 to 2.

3. The objective according to claim 1, further characterized in that the objective is configured in such a way that the difference between the focal length and the focal intercept can be adjusted to values of less than 50 mm.

4. The objective according to claim 1, further characterized in that the zooming device comprises an adjusting device for the displacement of at least one optical subcomponent along the optical axis of the objective.

5. The objective according to claim 1, further characterized in that a displacement path of at least 10 mm is provided between the first subcomponent on the object side and the second, adjacent optical subcomponent.

6. The objective according to claim 1, further characterized in that the subcomponent on the object side possesses a negative refractive power.

7. The objective according to claim 1, further characterized in that the subcomponent on the object side possesses a positive refractive power.

8. The objective according to claim 7, further characterized in that at least one subcomponent has a correction component.

9. The objective according to claim 1, further characterized in that the subcomponents comprise cemented members.

10. The objective according to claim 1, further characterized in that the objective has a zoom factor of lens magnification of at least 1.1.

11. A microscope, which has an objective designed so that an imaging is produced with it from finite to infinite and wherein the objective comprises an objective-lens-system, which consists of a first optical subcomponent on the object side, a second optical subcomponent, and a third optical subcomponent, wherein the second optical subcomponent is arranged at a distance to the first optical subcomponent on the optical axis of the objective and one of the first and second optical subcomponents possesses a positive refractive power and the other of the first and second optical subcomponents possesses a negative refractive power, wherein the third optical subcomponent is arranged on the optical axis of the objective at a distance to the second optical component of the objective, wherein two of the optical subcomponents can be moved along the axis, wherein the working distance of the objective is variable, wherein the focal length can be varied independently of the working distance, wherein the objective has a zooming device, wherein the second optical subcomponent and the third optical subcomponent can be moved relative to each other and relative to the first optical subcomponent, wherein one of the second and third optical subcomponents has a positive refractive power and the other of the second and third optical subcomponents has a negative refractive power and wherein, for focusing, a change in the relative position of the subcomponent of the objective on the object side can be conducted relative to the other two optical subcomponents.

12. The microscope according to claim 11, further characterized in that it represents a stereomicroscope.

13. An operating microscope, which has an objective designed so that an imaging is produced with it from finite to infinite and wherein the objective comprises an objective-lens-system, which consists of a first optical subcomponent on the object side, a second optical subcomponent, and a third optical subcomponent, wherein the second optical subcomponent is arranged at a distance to the first optical subcomponent on the optical axis of the objective and one of the first and second optical subcomponents possesses a positive refractive power and the other of the first and second optical subcomponents possesses a negative refractive power, wherein the third optical subcomponent is arranged on the optical axis of the objective at a distance to the second optical component of the objective, wherein two of the optical subcomponents can be moved along the axis, wherein the working distance of the objective is variable, wherein the focal length can be varied independently of the working distance, wherein the objective has a zooming device, wherein the second optical subcomponent and the third optical subcomponent can be moved relative to each other and relative to the first optical subcomponent, wherein one of the second and third optical subcomponents has a positive refractive power and the other of the second and third optical subcomponents has a negative refractive power and wherein, for focusing, a change in the relative position of the subcomponent of the objective on the object side can be conducted relative to the other two optical subcomponents.

14. The microscope according to claim 11, further characterized in that it has a digital image processing device.

15. The microscope according to claim 11, further characterized in that it has a control unit for adjusting different operating modes of the objective.

16. The microscope according to claim 15, further characterized in that the control unit comprises a control loop, wherein the control loop serves for adjusting the difference between the focal length and the focal intercept of the objective of the microscope.

* * * * *